July 1, 1930.　　　M. H. OVIATT　　　1,769,751
ANIMAL PINIONING AND JAW OPENING DEVICE
Filed Feb. 17, 1928　　3 Sheets-Sheet 3
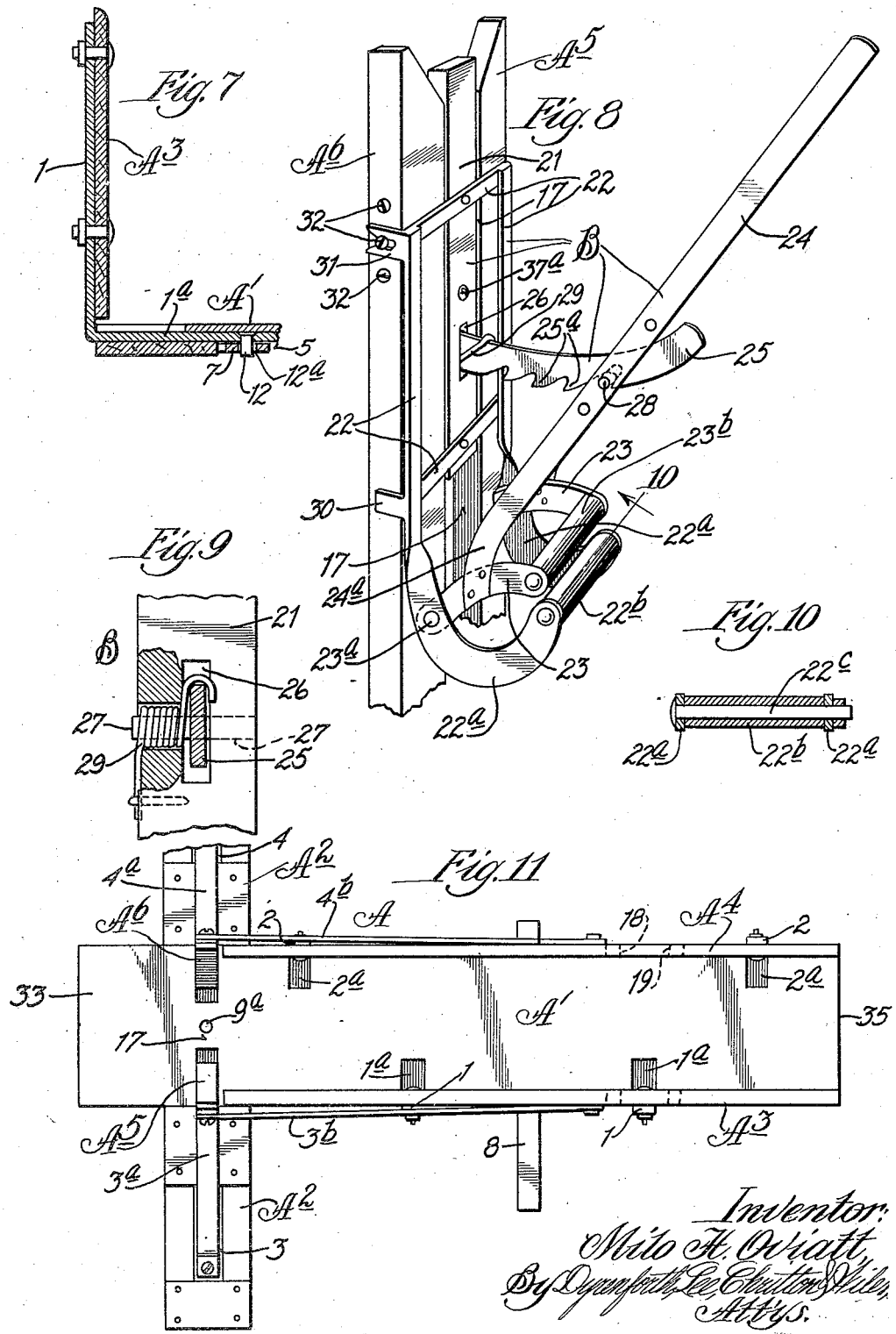

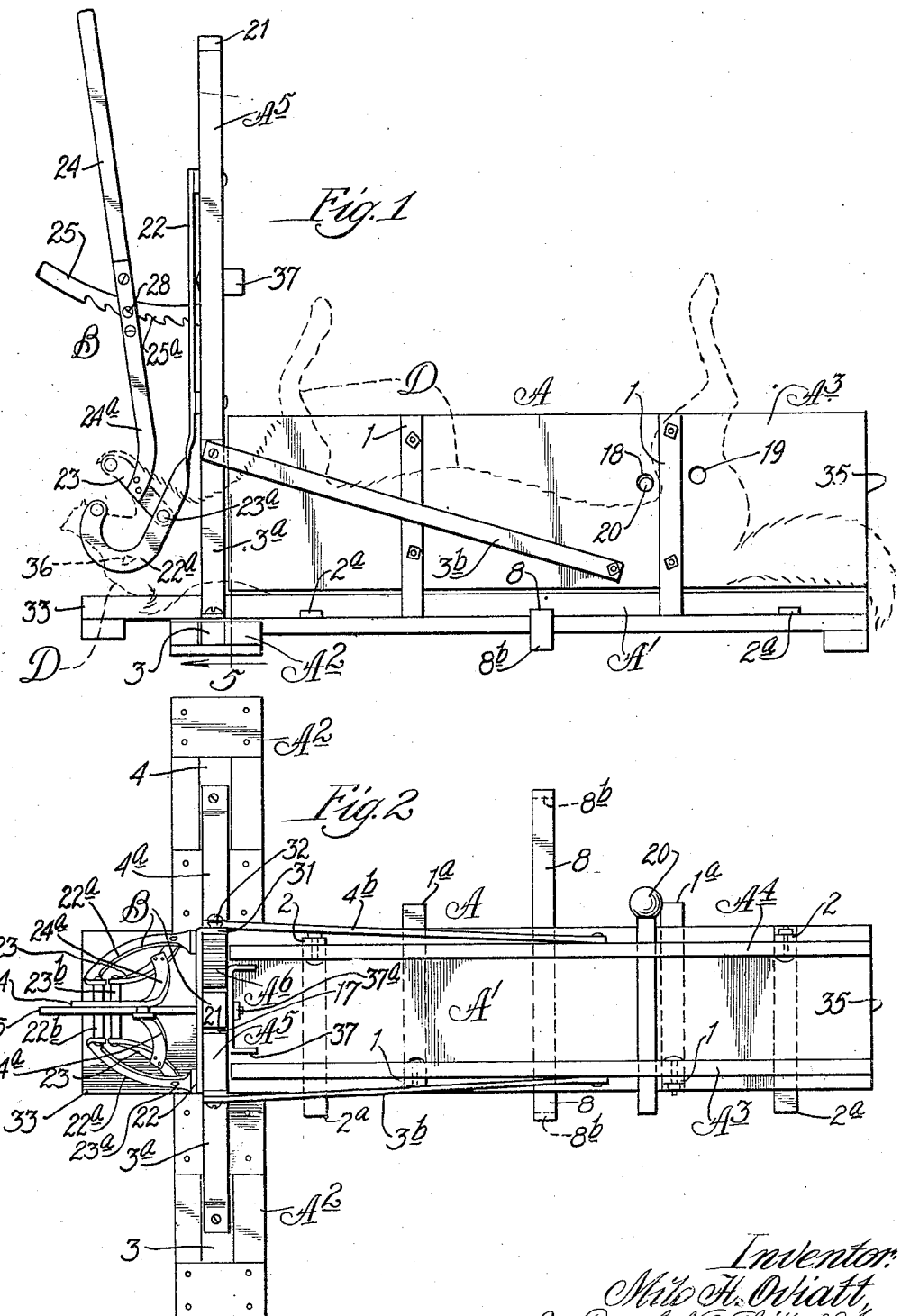

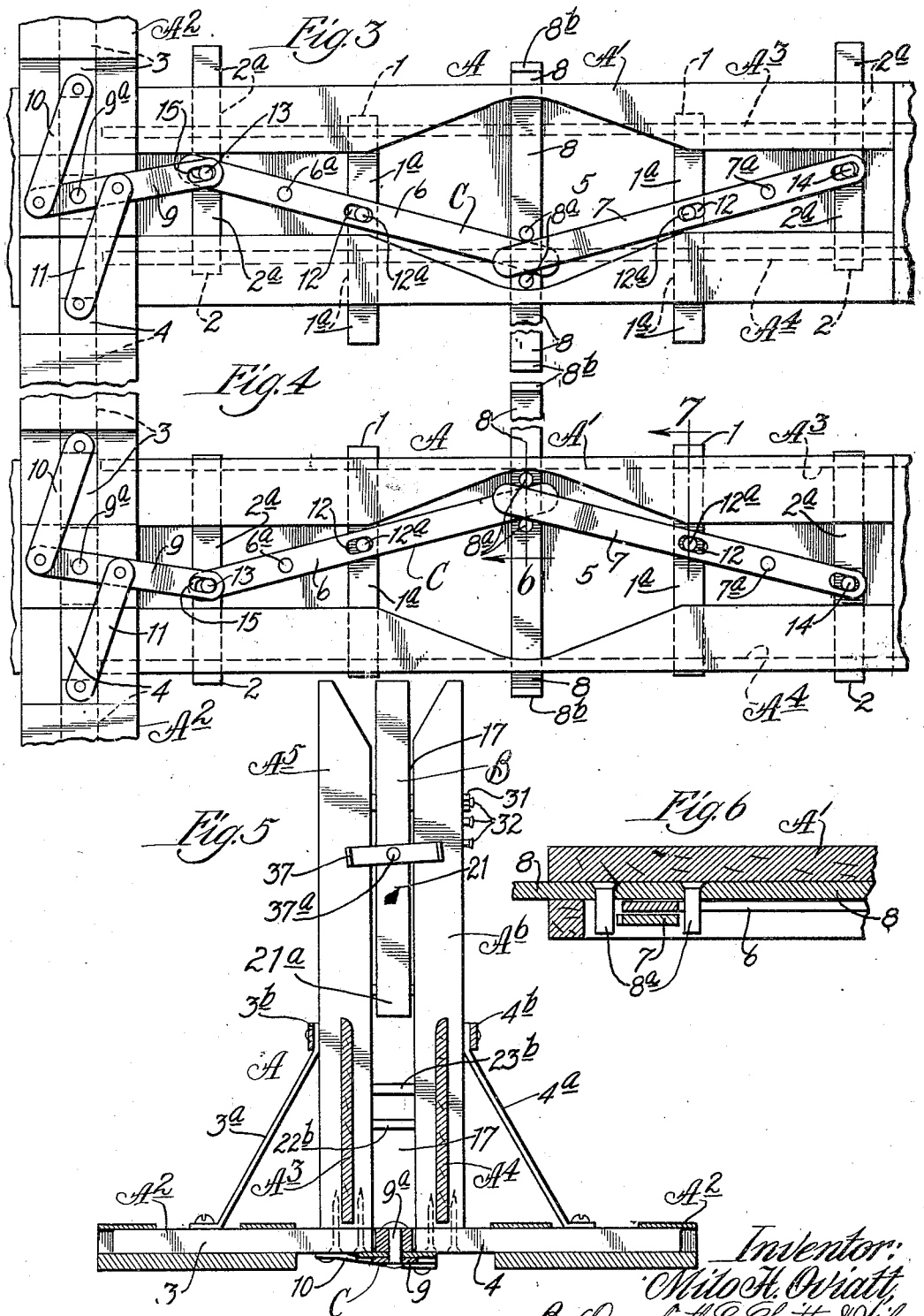

Patented July 1, 1930

1,769,751

UNITED STATES PATENT OFFICE

MILO H. OVIATT, OF WILLIAMS BAY, WISCONSIN

ANIMAL-PINIONING AND JAW-OPENING DEVICE

Application filed February 17, 1928. Serial No. 254,950.

This invention relates particularly to an animal stock and a jaw-opening device associated therewith.

The primary purpose is to provide an animal stock in which an animal can be held or pinioned and a jaw-opening device, these parts being so combined as to enable a small animal to be readily pinioned in the stock and have its jaws forced open, so that medicine can be readily administered.

The improved apparatus is especially useful for enabling foxes to be treated conveniently and safely. It may be used, however, in connection with the treatment of other small animals, such as dogs, where it is desired to administer medicine, or perform some surgical operation.

The invention comprises a body-pinioning device and a jaw-opening device associated therewith. These elements preferably are employed in combination, but may be separately employed.

The invention is illustrated in a preferred embodiment in the accompanying drawings, in which—

Fig. 1 is a side elevational view of an animal stock and a demountable jaw-opening device embodying the invention; Fig. 2, a plan view of the same; Fig. 3, a broken bottom plan view on an enlarged scale, showing the stock in collapsed, or body-pinioning, position; Fig. 4, a broken bottom plan view showing the stock in expanded condition; Fig. 5, a vertical sectional view taken as indicated at line 5 of Fig. 1; Fig. 6, a broken sectional view taken as indicated at line 6 of Fig. 4; Fig. 7, a broken sectional view taken as indicated at line 7 of Fig. 4; Fig. 8, a broken perspective view of the stanchion-members of the stock with the jaw-opening device mounted thereon; Fig. 9, a broken sectional view illustrating the manner in which a latch-pawl is mounted on the neck-pinioning member of the demountable jaw-opening device; Fig. 10, a sectional view showing one of the bits of the jaw-operating device; and Fig. 11, a broken plan view of the stock with the jaw-opening device removed.

In the embodiment illustrated, A designates an animal stock; and B designates a jaw-opening device demountably carried by the stanchion of the stock.

As will be understood from Figs. 1 and 11, the stock, which serves as an animal-pinioning device, is of general U-form cross-section to enable an animal to be placed upon its back within the stock, the stock being provided with relatively movable side-bracing members and relatively movable stanchion-members adapted to embrace the sides of the neck of the animal.

The stock A, in the form illustrated, comprises an elongated base $A'$ equipped at its lower side near one end with a cross-bar $A^2$; a pair of relatively movable side-plates $A^3$ and $A^4$ mounted on the base $A'$; and a pair of relatively movable stanchion-members $A^5$ and $A^6$ mounted on the cross-bar $A^2$.

The body and stanchion of the stock may be conveniently formed of wood.

The side-plate $A^3$ is carried by angle-bars 1; and the side-plate $A^4$ is carried by angle-bars 2. These angle-bars serve as slides, having horizontal members $1^a$ and $2^a$, respectively, which move in transverse slots with which the base $A'$ is provided.

The stanchion-members $A^5$ and $A^6$ are equipped at their lower ends with fixedly secured slides 3 and 4, respectively, which move in guides with which the cross-member $A^2$ is provided. Brace-members $3^a$ and $4^a$ connect the slides just mentioned with the upright portions of the stanchions; and brace-members $3^b$ and $4^b$ connect the upright portions of the stanchions with the side-plates $A^3$ and $A^4$, respectively. The brace-members $3^b$ and $4^b$ afford longitudinal braces. They are sufficiently flexible in themselves and in their connections to permit any necessary relative movement of the stanchion-members with relation to the side-plates $A^3$ and $A^4$.

The side-plates and stanchion-members are connected together and actuated by lever mechanism C which is housed in a channel 5 at the lower side of the base-plate. The mechanism C comprises a pair of levers 6 and 7 which are connected by pivots $6^a$ and $7^a$ to the base-plate; a cross-slide 8 movable in a transverse slot with which the base-plate is provided and serving as an actuating member for the levers 6 and 7, it being observed that the slide 8 is equipped with studs 8ᵃ adapted to engage the levers; and a lever 9 connected with the base-plate at its intersection with the cross-member A² by means of a pivot 9ᵃ, the lever 9 being connected by links 10 and 11 with the slides 3 and 4 of the stanchion-members A⁵ and A⁶.

The levers 6 and 7 are provided with slots 12 which engage studs 12ᵃ with which the members 1ᵃ are equipped. The opposite or remote ends of the levers 6 and 7 are provided with slots which engage studs 13 and 14 with which the front and rear members 2ᵃ are provided. The stud 13 engages a slot 15 with which the rear end of the lever 9 is provided.

It now will be understood that the sides A³ and A⁴ and the stanchion-members A⁵ and A⁶ may be moved transversely on the base by actuating the transverse slide 8. This slide is shown equipped at its ends with downturned finger-pieces 8ᵇ. It will be noted that the leverage is such that when the lever mechanism is actuated, the side-plates A³ and A⁴ will move faster than the stanchion-members A⁵ and A⁶. In the illustration given, the ratio is such that the side-plates will move about twice as far as the stanchion-members in any given movement of the actuating bar 8.

It will be noted, also, by reference to Fig. 5, which shows the stock in collapsed condition that the stanchion-members have their inner edges projecting inwardly some distance beyond the inner surfaces of the side-plates. Only small movement of the stanchion-members is required ordinarily. The slot 17 between the stanchion-members (Fig. 5) ordinarily is narrow enough, even in the expanded condition of the device, to embrace the sides of the neck of the animal with moderate closeness, so that the head of the animal cannot be withdrawn through the slot even before the clamping action has been effected.

In introducing an animal into the stock, it may be grasped by the tail and hind legs and thrown into the stock with its back down, the neck passing between the stanchion-members. When desired, the jaw-opening device may be applied in a manner to be described presently.

In Fig. 1, the dotted lines designated D show the outline of a fox resting on its back in the stock. The side-plates A³ and A⁴ are provided with perforations 18 and 19. Either set of perforations is adapted to receive a transverse pin 20. The perforations are so placed as to accommodate the device to animals of different sizes. The pin 20 extends across the longitudinal channel of the stock and is disposed in front of the hind legs of the animal, thus holding the body down in proper position.

The jaw-opening device B, in the illustration given, consists of a frame composed of a vertical bar 21 and a rectangular metal frame 22 secured thereto, the bar 21 being adapted to enter the space between the stanchion-members A⁵ and A⁶ and the frame-member 22 being provided with downward extensions 22ᵃ which are curved forwardly and upwardly and equipped with a bit 22ᵇ, thus providing a fixed jaw; a jaw 23 connected by pivots 23ᵃ to the members 22ᵃ, said jaw being equipped with a bit 23ᵇ; a lever 24 having forks 24ᵃ fixedly secured to the movable jaw 23; and a latching-pawl 25 having its rear end entered in a slot 26 with which the member 21 is provided and pivotally connected with the member 21 by means of a pintle 27. The latching-pawl 25 is in the form of a segment which is provided at its lower side with a plurality of teeth 25ᵃ. The pawl extends between the fork 24ᵃ, and the teeth are adapted to co-act with a stud 28 which connects the forks. As shown in Fig. 9, the pawl is yieldingly held in the depressed position by means of a spring 29.

The frame-member 22 of the jaw-opening device is in the form of a rectangular metal frame adapted to bear against the front surfaces of the stanchion-members while the upright wooden bar 21 is interposed between the stanchion-members. The frame 22 is equipped at one edge with rearwardly extending lugs 30 and 31 adapted to engage one edge of the stanchion-member A⁶. The lug 31 is a forked lug adapted to engage anyone of a vertical series of studs 32 with which the stanchion-member A⁶ is equipped at its outer edge.

The base A' has a portion 33 extending in front of the stanchion and serving as a head-rest.

The manner of using the device may be described briefly. After the animal, a fox, for example, has been thrown into the stock so as to rest on its back therein, the bar 8 is moved so as to actuate the lever mechanism C and close the stock. The pin 20 is then inserted; or, if desired, the pin may be inserted previous to the closing of the stock. After the animal has been thus pinioned, the bits of the jaw-opening device are presented to the animal, which will readily open its mouth and grasp the bits. The jaw-opening device is then swung upwardly to bring its frame into position parallel with the stanchion-members and the forked lug 31 is brought into engagement with one of the headed studs 32. The jaw-opening device is thus held in position in the stanchion. The lever 24 may then be actuated to separate the bits 22ᵇ and 23ᵇ and open the animal's mouth the desired distance. Each bit preferably consists of a bolt and a sleeve of soft metal, such as babbitt. For example, in Fig. 10, a bolt 22ᶜ connects the members 22ᵃ and a babbitt sleeve 22ᵈ encases the bolt. The purpose is to prevent the animal from breaking its teeth on the bits.

After the animal has been introduced into the stock and secured therein in the manner illustrated in Fig. 1, the stock may be swung from the horizontal position to a vertical position, so as to rest upon the end designated 35. This brings the animal to a vertical position where it is convenient to feed it medicine, make throat examinations, etc. Such examinations can be made with impunity, inasmuch as the jaws of the animal will be securely held in open position, it being noted that the latching-pawl 25 acts automatically to latch the jaws of the jaw-opening device in any desired open position.

The construction described is simple, cheap and thoroughly effective. Any suitable construction may be employed, however.

It will be noted by reference to Fig. 1 that the members 22ᵃ serve as blinders. Thus, the fox's eye is indicated at 36. The hiding of the eyes apparently has the effect of leading the fox to believe that it is hidden. When a fox is introduced into the stock, and pinioned therein, and after the jaw-opening device with the blinders has been applied, the fox ceases all struggling. In Fig. 5, the lower end 21ᵃ of the bar 21 is shown disposed some distance above the position of the bits. This lower end of the bar 21 serves as a throat-engaging member disposed just above the throat of the animal.

It should be added that it is preferred, as shown in Fig. 5, to equip the bar 21 with a pivoted clamping-member 37. This member is supported on the rear surface of the bar 21 by means of a pivot 37ᵃ. After the jaw-opening device has been properly placed in position, the bar 37 is turned so as to extend across the slot 17 between the stanchion-members and engage the rear surfaces of the stanchion-members, thus securely holding the jaw-opening device in position on the stanchion.

The foregoing detailed description has been given for clearness of understanding only, and no unnecessary limitations should be understood therefrom, but the appended claims should be construed as broadly as permissible, in view of the prior art.

What I regard as new, and desire to secure by Letters Patent, is:

1. An animal stock comprising a body receptacle and a stanchion at one end thereof; and a jaw-opening device mounted on said stanchion.

2. An animal stock comprising a body receptacle and neck-stanchion which are of general U-shape; and a jaw-opening device and throat-embracing means mounted adjacent said stanchion.

3. An animal stock comprising a base affording a back-support, side-embracing members forming with said back-support a body chamber, stanchion-members adapted to embrace the animal's neck, and interconnected means for effecting relative movement of the side-embracing members and relative movement of the stanchion-members.

4. An animal stock comprising a base affording a back-support, side-embracing members forming with said back-support a body chamber, stanchion-members adapted to embrace the animal's neck, means for effecting relative movement of the side-embracing members and relative movement of the stanchion-members; a jaw-opening device comprising a frame demountably held on the stanchion and equipped with a pair of jaws provided with bits, and a lever for separating said jaws.

5. An animal stock comprising a base affording a back-support, side-embracing members forming with said back-support a body chamber, stanchion-members adapted to embrace the animal's neck, means for effecting relative movement of the side-embracing members and relative movement of the stanchion-members; a jaw-opening device comprising a frame demountably held on the stanchion and equipped with a pair of jaws provided with bits, a lever for separating said jaws, and latching-means for securing the jaws in position to hold the bits separated.

6. In combination with an animal-pinioning stock adapted to hold an animal placed on its back therein; a jaw-opening device comprising a frame supported on said stock and equipped with a fixed jaw, and a movable jaw mounted on said first-mentioned jaw and equipped with an actuating-lever.

7. An animal stock comprising a U-shape body portion and a U-shape stanchion; and a frame-member co-acting with said stanchion and equipped with bit-equipped jaws and means for actuating said jaws.

8. An animal stock comprising a U-shape body portion and a U-shape stanchion; and a frame-member co-acting with said stanchion and equipped with bit-equipped jaws and means for opening and automatically latching said jaws.

9. An animal stock adapted to receive an animal on its back, said stock comprising body-embracing members, neck-embracing members, and mechanism for moving relatively the members simultaneously in such ratio that the neck-embracing members will have the shorter movement.

10. An animal stock comprising a base, a pair of body-embracing members movably mounted on said base, a pair of stanchion-members movably mounted on said base, and lever mechanism mounted on said base and connecting said members for movement in unison, said stanchion-members having the shorter movement.

11. A portable animal stock comprising relatively movable body-embracing members and relatively movable stanchion-members, presenting an open channel for receiving an animal with its back in the bottom of the channel; and jaw-opening means adjustably related to the stanchion.

12. A portable animal stock comprising relatively movable body-embracing members and relatively movable stanchion-members, presenting an open channel for receiving an animal with its back in the bottom of the channel; and jaw-opening means adjustably related to and coacting with the stanchion, said jaw-opening means having a frame equipped with throat-embracing means.

13. A portable animal stock comprising a base, relatively movable body-embracing members mounted on said base, relatively movable stanchion-members mounted on said base, said base and members presenting an open channel for receiving an animal with its back in the bottom of the channel, and lever mechanism connected with said base and adapted to effect relative movement of said members; and a demountable jaw-opening device secured to the stanchion-members.

14. A jaw-opening device comprising a frame equipped with a fixed jaw, a jaw pivotally mounted on the fixed jaw, a lever extending from the movable jaw equipped with a latching-shoulder, and a latching-pawl pivotally connected with said frame and provided with a plurality of latching-teeth.

15. A demountable jaw-opening device for the purpose set forth, comprising a frame, means for detachably connecting said frame to an animal stock, a fixed jaw carried by said frame, a movable jaw connected with said first-mentioned jaw, an actuating-lever for the movable jaw, and latching-means for said lever.

16. An animal stock comprising a body receptacle and a stanchion at one end thereof; and a jaw-opening means provided with a frame demountably held on the stanchion.

MILO H. OVIATT.